(No Model.)
A. PARTRIDGE.
WHEEL.
No. 375,682. Patented Dec. 27, 1887.
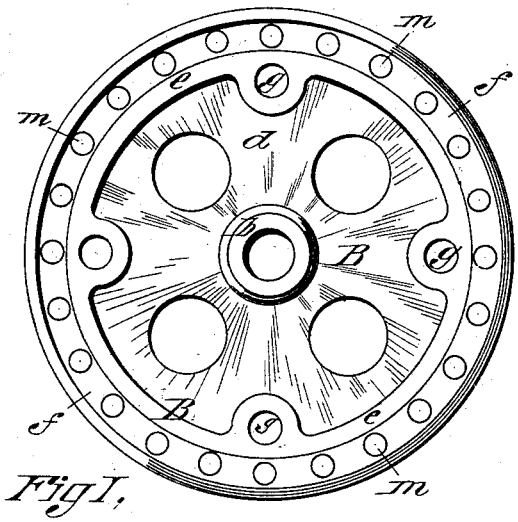
Fig I.
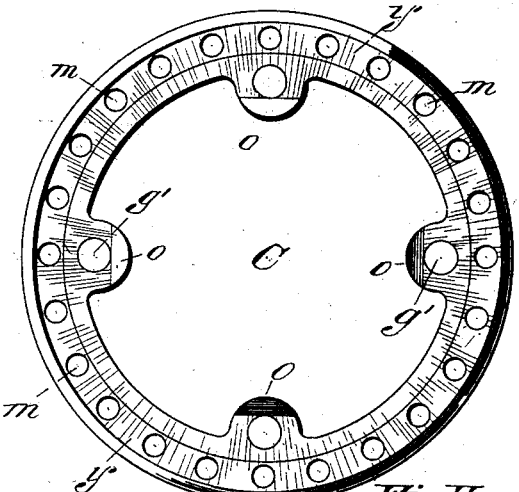
Fig II.
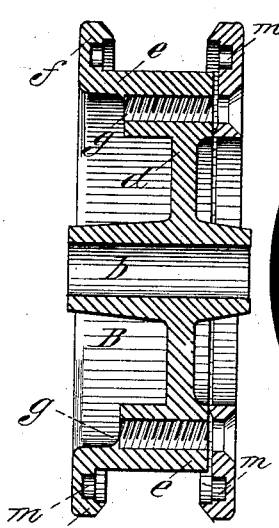
Fig III.
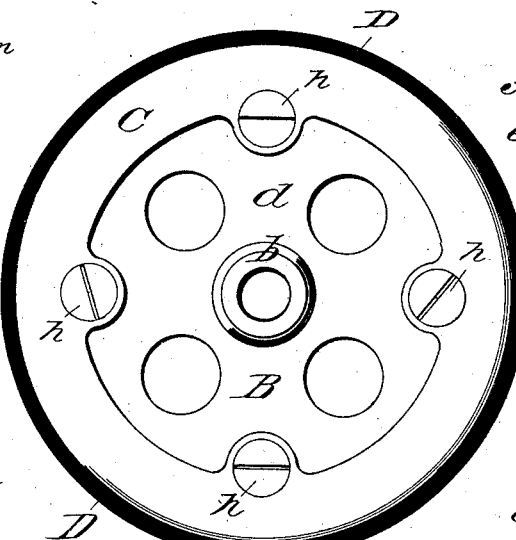
Fig V.
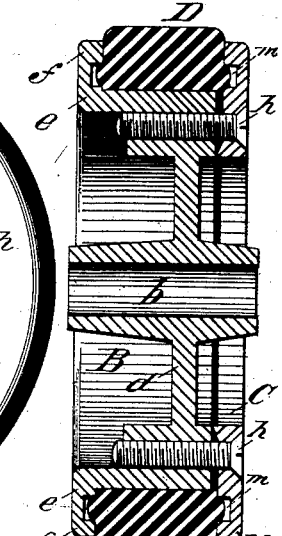
Fig IV.
Witnesses,
M. H. Burrall
E. E. Case
Inventor,
A. Partridge,
by R. F. Hyde
Atty.

UNITED STATES PATENT OFFICE.

ANDREW PARTRIDGE, OF SPRINGFIELD, ASSIGNOR OF ONE-HALF TO SAMUEL P. WELD, OF BOND'S VILLAGE, MASSACHUSETTS.

WHEEL.

SPECIFICATION forming part of Letters Patent No. 375,682, dated December 27, 1887.

Application filed August 3, 1887. Serial No. 246,069. (No model.)

*To all whom it may concern:*

Be it known that I, ANDREW PARTRIDGE, a citizen of the United States, residing at Springfield, county of Hampden, and State of Massachusetts, have invented a new and useful Improved Truck-Wheel, of which the following is a specification.

My improvements relate to that class of truck-wheel employing a rubber tire; and the invention consists in the combination and construction as hereinafter described, and more particularly pointed out in the claims.

My invention is fully illustrated in the accompanying drawings, in which—

Figure I is a plan view of one section of a wheel of my construction with the rubber tire removed. Fig. II is a plan view of the corresponding section of a wheel, which, with the tire, completes the wheel. Fig. III is a cross-section of a wheel complete, except for the tire and clamping-screws. Fig. IV is the same view of a complete wheel, and Fig. V is one side view of a complete wheel.

B is one section of the wheel, consisting of the hub $b$, web $d$, rim $e$, affording the shoulder for seating the tire, flange $f$, rising from one edge of the rim, and screw-sockets $g$, extending transversely through the web and arranged near the rim.

C is another section in the form of a ring-flange, provided with screw-holes corresponding to the screw-sockets $g$, and, when combined with the section B by means of the clamp-screws $h$, supplying a flange, $y$, upon the remaining edge of the rim $e$, a reverse counterpart of the one $f$; and D is a rubber tire slid over the rim to come against the flange $f$ and be confined between the two flanges drawn together by the screws $h$.

$m\ m$ are holes sunk in the opposite inner faces of the flanges $f\ y$, and $o\ o$ are fulcrums raised from the inner face of ring-section C, arranged inside of the screw-holes $g'$, and adapted to bear upon a corresponding face of the section B. The metal of which section C is composed has a radial depth greater than that of its flange-surface $y$, so that a face is left to bear upon a corresponding surface on the side of section B, and the screw-holes $g'$ are arranged in the two sections to be between the tire-seating shoulder and the hub $b$, so that the heads of the screws $h$ bear over their entire extent in the section C to draw its flange parallel to the one $f$.

The fulcrums $o$, in place of being detached ones, as shown, may be in the form of a complete ring interposed between the holes $g'$ and the hub $b$ and integral with either section B or C; but as arranged upon the lugs, through which the holes $g'$ are made and of configuration as seen in Figs. II and IV, they answer every purpose.

In Fig. IV the tire D is shown compressed in place until, the fulcrums $o$ bearing upon the surface of section B, the section C is drawn by the screws $h$ to have the flange $y$ parallel to the one $f$.

The tire D, when first placed upon the shoulder of section B and with one side in contact with flange $f$, has its other side project beyond the rim $e$, so as to set off the section C to remove its fulcrums from contact with the side of section B, and the operation in drawing the section C to compress the rubber of the screws is to unevenly compress the rubber in springing to some extent the metal until the fulcrums come to a rigid bearing, from which time compression is imparted to the tire until the flange $y$ is brought to its proper place, the position of the fulcrums, in effect, shortening the lever-arm of the flange and enabling the screws to operate to better advantage to compress the rubber and to cause the pressure of the rubber to be in a direction more nearly coincident with the axis of the screws. By these means a wheel is made in two strong compressing-sections without the necessity of dividing the tire-bearing shoulder or hub, to involve great difficulty in their adjustment.

Heretofore, to prevent the tire from springing away from its shoulder or from rotating thereon, spurs upon the shoulder or flanges or penetrating-points from the flanges have been used; but every body projecting into the tire from the flanges or shoulder by so much reduces the elastic area of the tire, and in the case of spurs from the flanges the rubber is often pushed away and compressed by the point of the spur to imperfectly close against its sides, to thereby leave a space into which moisture can penetrate to shorten the life of the tire. Where rivets extend from the flanges transversely through the tire, the elasticity of the tire in a radial direction is impaired to such an extent as ultimately to wear unevenly and "pound" in rotating; but by sinking a series of holes, *m*, in the opposite faces of the flanges the compression of the tire into place causes the rubber to be forced into said holes to cause the tire to be firmly held from rotating upon or otherwise moving from its seating-shoulder, and the entire section of the tire at every point has a uniform elasticity.

Now, having described my invention, what I claim is—

1. In truck-wheels, a section, B, consisting of hub *b*, web *d*, tire-seating rim *c*, screw-sockets *g*, and flange *f*, all integral, a section, C, adapted to bear upon the open side of rim *e* and have a flange, *y*, extend outward therefrom to correspond with flange *f*, and an inward-extending flange from rim *e*, bearing upon the web, and seating-screws *h* in holes *g'*, located between the inner perimeter of section C and rim *e*, and at points entirely removed from said inner perimeter, a series of holes, *m*, in the inner faces of flanges *f y*, and a rubber tire, D, all combined and arranged as and for the purpose set forth.

2. In combination with two rubber tire-compressing sections of a truck-wheel provided with flanges adapted to inclose between them the tire, and with a rubber tire, D, a series of holes, *m*, sunk in the face of a flange to receive a portion of the compressed rubber, as and for the purpose set forth.

ANDREW PARTRIDGE.

Witnesses:
 R. F. HYDE,
 SAMUEL P. WELD.